No. 606,739. Patented July 5, 1898.
F. A. ROTHGERY.
FEED WATER COUPLING FOR FIRE ENGINES.
(Application filed Feb. 1, 1896. Renewed Feb. 1, 1898.)
(No Model.)
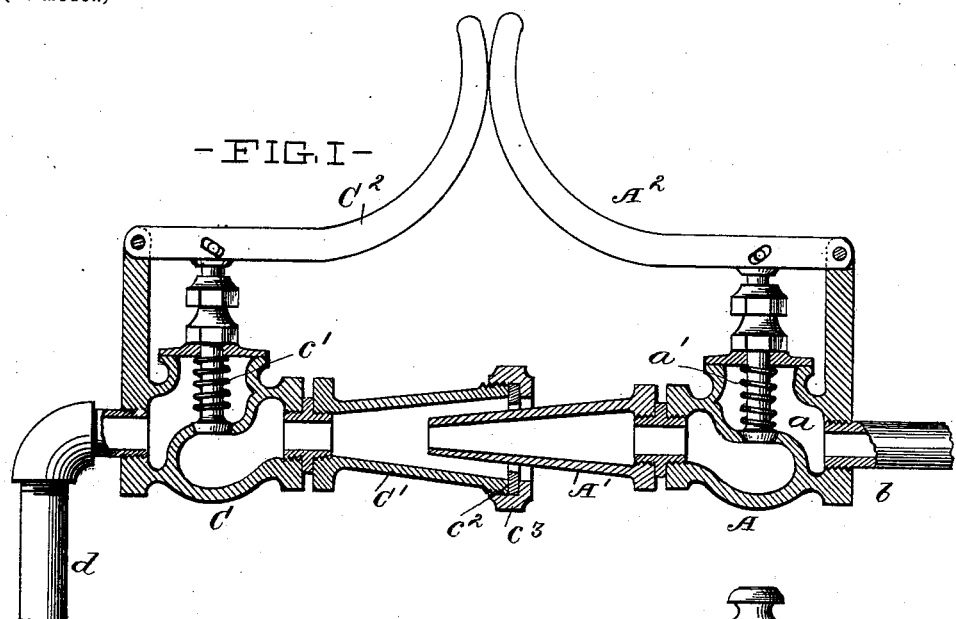
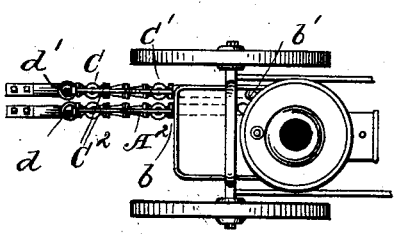
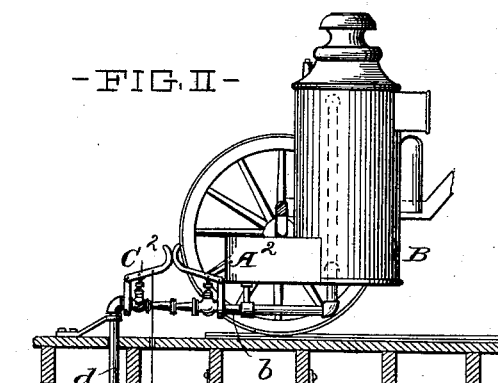
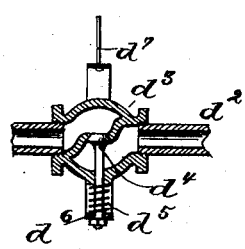
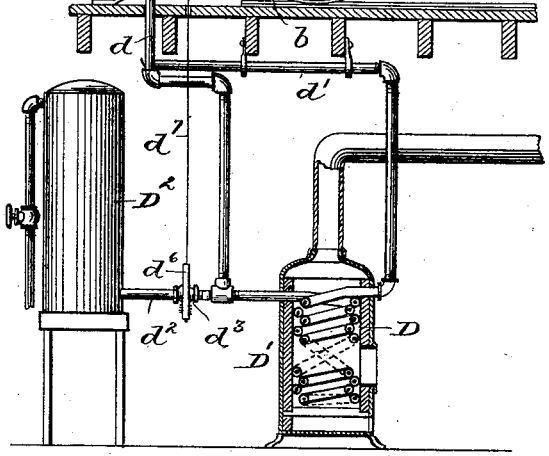
WITNESSES:
J. C. Turner
Wm Lecher
INVENTOR:
F. A. Rothgery
By Hall & Fay
ATTORNEYS.

UNITED STATES PATENT OFFICE.

FRANK A. ROTHGERY, OF CLEVELAND, OHIO.

FEED-WATER COUPLING FOR FIRE-ENGINES.

SPECIFICATION forming part of Letters Patent No. 606,739, dated July 5, 1898.

Application filed February 1, 1896. Renewed February 1, 1898. Serial No. 668,773. (No model.)

*To all whom it may concern:*

Be it known that I, FRANK A. ROTHGERY, a citizen of the United States, and a resident of Cleveland, county of Cuyahoga and State of Ohio, have invented certain new and useful Improvements in Feed-Water Couplings for Fire-Engines, of which the following is a specification, the principle of the invention being therein explained and the best mode in which I have contemplated applying that principle, so as to distinguish it from other inventions.

The annexed drawings and the following description set forth in detail one mechanical form embodying the invention, such detail construction being but one of various mechanical forms in which the principle of the invention may be used.

In said annexed drawings, Figure I represents a longitudinal section through the two members of my improved feed-water coupling; Fig. II, a view illustrating the connections between the fire-engine and the feed-water heater; Fig. III, a top plan view of the engine-boiler and the couplings, and Fig. IV a section of the valve between the tank and heating-coil.

The coupling has a valve-casing A, illustrated in the drawings as a globe-valve, having an outwardly-tapering nozzle A' and secured upon one of the pipes $b$ and $b'$, which respectively enter the bottom and near the top of the boiler B of the engine. One valve-casing and nozzle is provided for each pipe. A valve $a$ has play upon a seat in the valve-casing and has a spring $a'$, which seats the valve. An upwardly-curved bumper-lever $A^2$ is fulcrumed upon the valve-casing and is movably connected to the valve-stem so as to open the valve when raised. A valve-casing C, similar to the valve-casing A, has an outwardly-flaring nozzle C', and is secured upon one of the feed-water pipes $d$ and $d'$. A valve $c$ has play upon a seat in the valve-casing and has a spring $c'$, which seats the valve. An upwardly-curved bumper-lever $c^2$ is fulcrumed upon the valve-casing and is movably connected to the valve-stem so as to open the valve when raised. The outwardly-flaring nozzle has a gasket $c^2$, secured at its end by means of a screw-cap $c^3$, so that a tight fit may be formed when the tapering nozzle is introduced into the flaring nozzle. A heating-coil D is located within a suitable heater or furnace D', and said coil has the pipe $d'$ connected to one end. The other end of the coil extends to a water-tank $D^2$, through a pipe $d^2$, from which pipe the feed-pipe $d$ extends upward, the heater and tank being preferably located below the floor upon which the fire-engine stands. A valve-casing $d^3$ is located upon the pipe $d^2$ and has a downwardly-opening valve $d^4$, having a spring $d^5$, which serves to open the valve. A yoke $d^6$ is secured to the valve-stem and extends around the valve-casing, having a cord, chain, or wire $d^7$ extending upward through the floor to one of the bumper-levers for the stationary feed-water-pipe valves.

When the apparatus is in position in the engine-house and upon the engine and the latter is backed into the engine-house, the nozzles upon the engine enter the nozzles upon the stationary pipes, and the bumper-levers engage and rise, opening the valves for the nozzles and establishing communication between the heating-coil and the engine-boiler. The water in the engine-boiler may thus be kept hot and under a sufficient pressure while the engine is idle in the house to gain a working pressure in a reasonably short time when fire is started in the boiler-furnace. When the engine is pulled out, the tank-valve $d^4$, which has been closed, will be opened by its spring as the bumper-levers drop and close the valves which control the communication between the engine-boiler and the stationary feed-water heater. The opening of the tank-valve will admit of the coil in the heater remaining filled while the engine is disconnected from the heating-circuit, thereby preventing burning of the coil. In apparatus with which I have heretofore been acquainted the opening of the coupling-valve and the closing of the tank-valve has usually been manually controlled, even though the closing of the coupling-valves and the opening of the tank-valve was automatic. In a fire-engine house, however, it is of importance to save all time possible and to have absolute certainty that all necessary acts are promptly and certainly performed, and for this reason it is desirable to have simple and reliable automatic devices to perform such acts, wherever such devices are applicable.

This present device is automatically acting as well when the engine is backed into the house as when it is drawn out, and the bumpers may be so constructed that they cannot fail to act in either instance.

As the upwardly-curved ends of the bumper-levers are curved on substantially circular lines, the levers cannot fail to rise when the curved ends are brought to bear against one another, and the valves will be evenly and gently raised by the curved bumper-surfaces rocking one upon the other, so that no shock or sudden strain will be exerted upon the couplings, pipes, engine-boiler, tank, or heating-coil by a too-sudden connection between the boiler and the heating apparatus and a too-sudden change of water-pressure, steam-pressure, or steam and water pressure in the several parts.

Other modes of applying the principle of my invention may be employed for the mode herein explained. Change may therefore be made as regards the mechanism thus disclosed, provided the principles of construction set forth, respectively, in the following claims are employed.

I therefore particularly point out and distinctly claim as my invention—

1. In a pipe-coupling device, the combination of two nozzles constructed to engage and form a fluid connection, valves controlling the passages through said nozzles, and bumper-levers, each connected to open one of said valves when rocked, and having a circularly-curved bumping end which may engage and bear against the similar end of the opposite lever and rock upon the same to rock the levers when the levers and nozzles are forced together, substantially as set forth.

2. In a pipe-coupling device, the combination of two nozzles constructed to engage and form a fluid connection, valves controlling the passages through said nozzles and provided with means for automatically closing them, and bumper-levers, each connected to open one of said valves when rocked, and having a circularly-curved bumping end which may engage and bear against the similar end of the opposite lever and rock upon the same to rock the levers and open the valves when the levers and nozzles are forced together, substantially as set forth.

3. In a pipe-coupling device, the combination of an outwardly-tapering nozzle, a valve controlling the passage through said nozzle and having a spring for closing it, a bumper-lever connected to open the valve when raised and having a circularly-curved outer bumper end, an outwardly-flaring nozzle adapted to have the tapering nozzle fit into it, a valve controlling the passage through said nozzle and having a spring for closing it, and a bumper-lever connected to open the valve when raised and formed with a circularly-curved outer bumper end, the two bumper-levers being so arranged and constructed with circularly-curved bumper ends that their curved ends engage and gradually raise the levers by rocking one upon the other when forced together in coupling the nozzles, substantially as set forth.

4. In feed-water-heating apparatus, the combination with stationary and engine-coupling nozzles having bumpers for controlling their valves, of a heating-coil connected to said nozzles, a supply-tank connected to one branch of said coil, and an automatically-opening valve upon the connection between the tank and coil and provided with a connection to a bumper whereby the valve is closed when the bumpers are engaged and released to open when the bumpers are disengaged, substantially as set forth.

In testimony that I claim the foregoing to be my invention I have hereunto set my hand this 30th day of Januray, A. D. 1896.

F. A. ROTHGERY.

Witnesses:
WM. SECHER,
DAVID T. DAVIES.